United States Patent [19]

Liu

[11] Patent Number: 5,340,985
[45] Date of Patent: Aug. 23, 1994

[54] MIXED FIELD RADIATION DOSIMETER

[75] Inventor: James C. Liu, Palo Alto, Calif.

[73] Assignee: The Board of Trustees of Leland Stanford, Junior University, Stanford, Calif.

[21] Appl. No.: 905,274

[22] Filed: Jun. 26, 1992

[51] Int. Cl.$^5$ ............................. G01T 1/02; G01T 1/11
[52] U.S. Cl. .................................. 250/337; 250/484.2
[58] Field of Search ........... 250/337, 484.1 A, 390.03, 250/482.1

[56] References Cited

U.S. PATENT DOCUMENTS

| | | |
|---|---|---|
| 3,420,999 | 1/1969 | Distenfeld . |
| 3,484,605 | 12/1969 | Attix . |
| 3,761,710 | 9/1973 | Yamashita et al. . |
| 3,792,277 | 2/1974 | Yamashita et al. . |
| 4,091,284 | 5/1978 | Yamamoto et al. . |
| 4,303,857 | 12/1981 | Inoue et al. . |
| 4,492,872 | 1/1985 | Burgkhart et al. ............. 250/390.03 |
| 5,004,921 | 4/1991 | Moscovitch . |

Primary Examiner—Paul M. Dzierzynski
Assistant Examiner—Richard Hanig
Attorney, Agent, or Firm—McCubbrey, Bartels & Ward

[57] ABSTRACT

A dosimeter for use in mixed radiation fields is disclosed. The dosimeter consisting of a single element may be used in a photon-neutron field if the energies of the photons and neutrons are known. In a mixed photon-neutron-beta radiation field of unknown energies, a detector having four elements is sufficient to provide an estimate of the exposure. The dosimeter makes use of the high temperature readout from a 6Li doped LiF thermoluminescent detector to provide an estimate of both the neutron and photon exposures.

2 Claims, 2 Drawing Sheets 5,340,985

MIXED FIELD RADIATION DOSIMETER

FIELD OF THE INVENTION

This invention was made with Government support under Contract No. DE-AC03-76SF00515 awarded by DOE. The Government has certain rights in the invention.

The present invention relates to radiation dosimeters, and more particularly, to a radiation dosimeter that simultaneously measures exposure to neutron, photon, and beta radiation.

BACKGROUND OF THE INVENTION

It is common place for workers whose occupations require the worker to be exposed to radiation to wear a dosimeter for monitoring the extent of the worker's exposure. The dosimeters are constructed from materials that record the passage of energetic particles through the material. The response of these materials depends both on the type of radiation passing there through and the energy of the radiation. Early radiation dosimeters were constructed from photographic film. After the film was exposed to the radiation field, the film was developed and the degree of "fogging" of the film determined by measuring the opacity of the developed film. While this type of device is relatively cheap, it has low sensitivity to neutron radiation and requires a significant amount of processing to read-out the amount of radiation to which the worker was exposed.

More recent dosimeter designs utilize TL (thermoluminescent) phosphor elements to detect radiation in the dosimeters. These TL elements generate a light signal when heated. The light signal depends on the degree of exposure of the element to various types of radiation prior to the heating operation. These elements have higher sensitivities to neutron radiation and require less processing than photographic film based elements; hence, these elements have become widely used in dosimeters.

If the worker is exposed to a single type of radiation at a single energy, a single dosimetric element constructed from one of these TL materials could be used to measure the worker's exposure. However, such exposures are rare. In general, a worker is exposed to a mixed radiation field including two or more types of radiation. Mixed field dosimeters are typically constructed from a plurality of dosimetric elements having differing responses to the components of the mixed radiation field. A typical dosimetric element includes a TL element and a filter element. The filter element preferentially removes incident radiation of a particular type. For example, a filter element constructed from Cd preferentially removes thermal neutrons. By combining the measurements made with the various dosimetric elements, the radiation exposure of the worker arising from the mixed radiation field can be calculated. Radiation monitors for measuring the exposure of a worker in a photon-beta field typically require four such dosimetric elements. Similarly, the exposure of a worker to a neutron-photon field may be obtained with the aid of a four element detector.

A worker exposed to a mixed neutron-photon-beta field typically wears two four-element detectors to adequately measure the workers exposure. It would be desirable to reduce the number of dosimetric elements that must be processed to provide the exposure data for each worker in such mixed fields.

Attempts to construct a single four element monitoring device with satisfactory response in a mixed neutron-photon-beta field have been unsatisfactory. While four element detectors may be used in some mixed fields, unsatisfactory error rates are found to occur if the mixed field includes significant quantities of thermal neutrons.

Broadly, it is the object of the present invention to provide an improved radiation dosimeter that may be used in mixed neutron-photon-beta fields.

It is a further object of the present invention to provide a dosimeter that requires only four dosimetric elements in most practical fields.

These and other objects of the present invention will become apparent to those skilled in the art from the following detailed description of the invention and the accompanying drawings.

SUMMARY OF THE INVENTION

The present invention comprises a dosimeter design and methodology that allows measurements of a mixed photon-neutron radiation field to be made with a single element dosimeter if the energies of the photons and neutrons are known. The single element preferably comprises a 6LiF detector that is shielded by Cd to remove thermal neutrons from the radiation field. The detector signal is measured in a manner that allows two values to be generated: one indicative of the neutron exposure of the detector and the other indicative of the combined neutron and photon exposure. In those applications in which the neutron and photon energies are not known, or in which beta rays are also present, the detector is combined with additional detectors to provide a measurement of the exposure to the radiation field.

DETAILED DESCRIPTION OF THE INVENTION

The present invention is based on a novel use of a 6LiF chip of the type commonly used in radiation dosimeters. Thermoluminescent dosimeters based on LiF chips record the radiation exposure of the chip by storing charge in high energy quantum states. The stored charge may be returned to the low energy quantum states by heating the chip. During the heating process the chip emits light. The amount of light emitted is indicative of the amount of charge that was trapped in the high energy states and is a measure of the amount of radiation to which the chip was exposed.

The LiF chips are doped with different Li isotopes to provide sensitivity to different types of radiation. Chips doped with 6Li may be used to measure photons, betas, and neutrons. Chips doped with 7Li are sensitive to photons and beta rays.

In prior art dosimetry applications, the LiF chips are combined with various filters to form a personnel monitoring device. Each chip with its filter provides one measurement of the radiation field. In mixed radiation fields, this measurement provides data on one weighted sum of the types of radiation present in the field. Different radiation types have different effects on the body. Hence, the exposure to each type of radiation must be measured to compute the dose received by the body. By combining the measurements from several chip and filter combinations the exposures to the individual radiation types may be determined.

As noted above, a dosimeter for use in a mixed photon-beta radiation field usually requires 4 chip and filter combinations. If the radiation field also includes neutrons, a second multi-element dosimeter is generally required to properly compute the neutron exposure.

The present invention provides a means for computing the exposure in a mixed neutron-beta-photon field with only 4 elements in a single dosimeter. This reduction is made possible by utilizing a 6Li doped LiF chip to provide two separate measurements of the radiation intensity, thereby allowing both photon and neutron radiation measurements to be made with a single chip.

Figure 1:
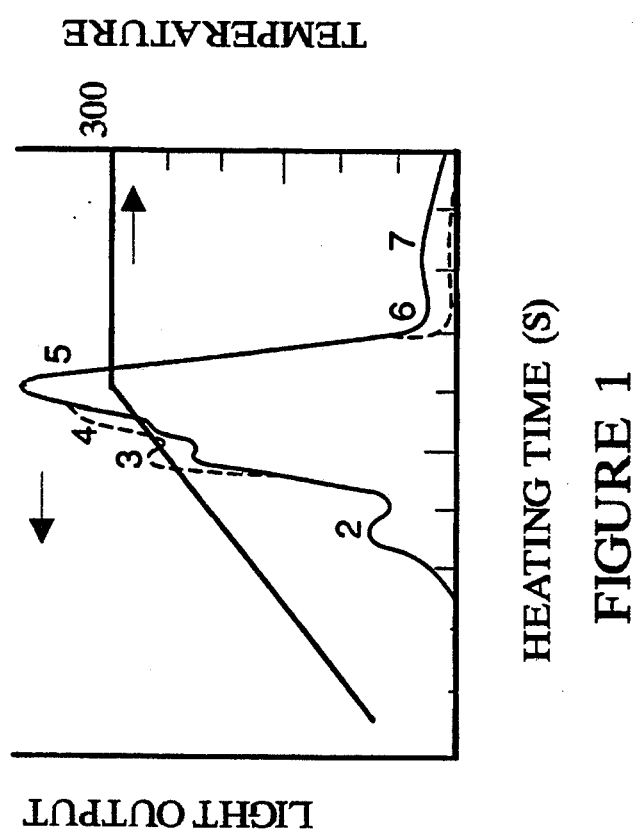
FIG. 1 illustrates the light output of a typical 6LiF chip after exposure to photons and neutrons.

FIG. 1 illustrates the light output upon heating of a typical 6Li doped LiF chip after exposure to photons and neutrons. The chip utilized is a TLD-600 which may be obtained from Solon Technologies, Inc. of Solon, Ohio. The light output is measured as a function of the time over which it is heated. The solid curve illustrates the light output of a dosimetric element that had been previously exposed to neutron radiation, and the dashed curve illustrates the light output of a dosimetric element that had been previously exposed to photon radiation. The curves were measured by heating the dosimetric element according to the temperature profile shown in the FIGURE. It should be noted that exposure to neutrons gives rise to two higher peaks shown at 6 and 7 than those induced by photons. These peaks allow one to separate the neutron signal from the photon signal with a single dosimetric element. In prior art systems, the area of the light output curve is used to determine exposure. In the present invention, two light output area measurements are made from dosimetric element 12, one corresponding to the area under peaks 3–5 and one corresponding to the area under peaks 6–7.

A single dosimetric element dosimeter for measuring exposure to photons and neutrons may be constructed by shielding the LiF chip from the source with a Cd filter element which is 0.46 mm thick. The filter element removes incident thermal neutrons. The higher energy neutrons pass through the filter and chip and enter the body of the person wearing the dosimeter. The high energy neutrons generate albedo neutrons in the body. A portion of the albedo thermal neutrons exit the body and are intercepted and measured by the chip. After exposure, the chip is heated and the light output measured as discussed above with reference to FIG. 1.

The area under peaks 3–5 at the low end of the curve and the area under peaks 6–7 at the high end of the curve are determined from the light output curve. These two area measurements will be denoted by $T_l$ and $T_h$, respectively. It is assumed that the element has been irradiated with a neutron dose equivalent ($H_n$ in units of mSv) and a photon dose equivalent ($H_p$ in units of mSv). Then it can be shown that $$T_h = H_n S_n K_n + H_p S_p K_p \text{ (peaks 6–7)} \quad (1)$$

$$T_l = H_n S_n (1-K_n) + H_p S_p (1-K_p) \text{ (peaks 3–5)} \quad (2)$$

where $K_n$, $K_p$ are K values for neutrons and photon radiations, respectively.

$K = (T_h/T_l)/[1+(T_h/T_l)]$ = peaks 6–7/peaks 3–7.

$S_n$, $S_p$ are neutron and photon sensitivities (peaks 3–7) of the Cd-covered chip in units of mR mSv$^{-1}$.

$H_n S_n K_n$ is the signal component of peaks 6–7 that is contributed by neutrons.

$H_p S_p K_p$ is the signal component of peaks 6–7 that is contributed by photons.

It can be shown that $(T_h/T_l)$ is constant for all neutron energies of interest, and hence, $K_n$ also does not vary with neutron energy. The value of $K_p$, however, does depend on photon energy. This value can be determined from appropriate calibration studies. If neutron and photon energies are known, this fixes $S_n$ and $S_p$ as well as $K_p$. Hence, there are only two unknowns, $H_n$ and $H_p$, in Eqs. 1–2, and these equations may then be solved to provide the dose equivalents.

In those situations in which the photon source energy in the radiation field is not known and the field includes betas with unknown energy, a more complex dosimeter design employing four elements is required. Such a multi-element dosimeter design allows for measurement of the radiation dose in a mixed photon-neutron-beta radiation field.

Figure 2:
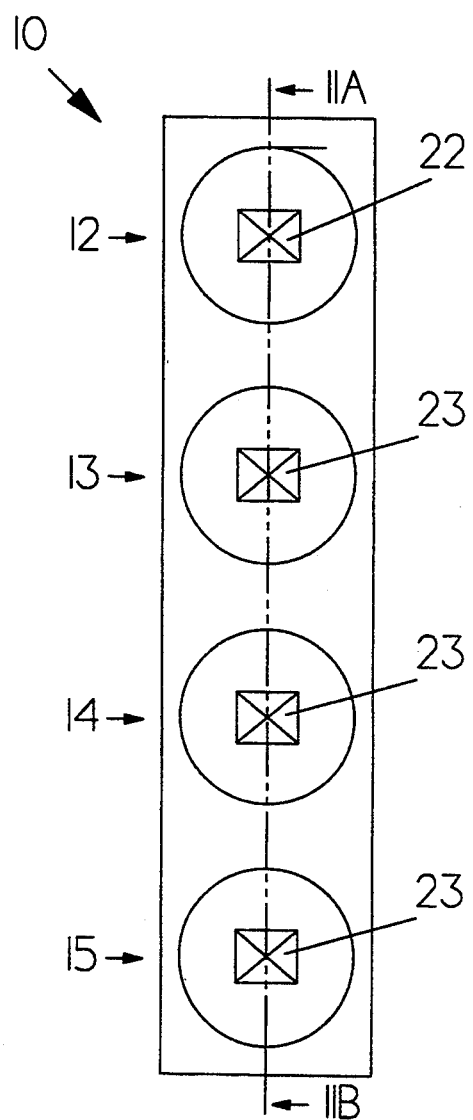
FIG. 2 is a top view of a dosimeter according to the present invention.
Figure 3:
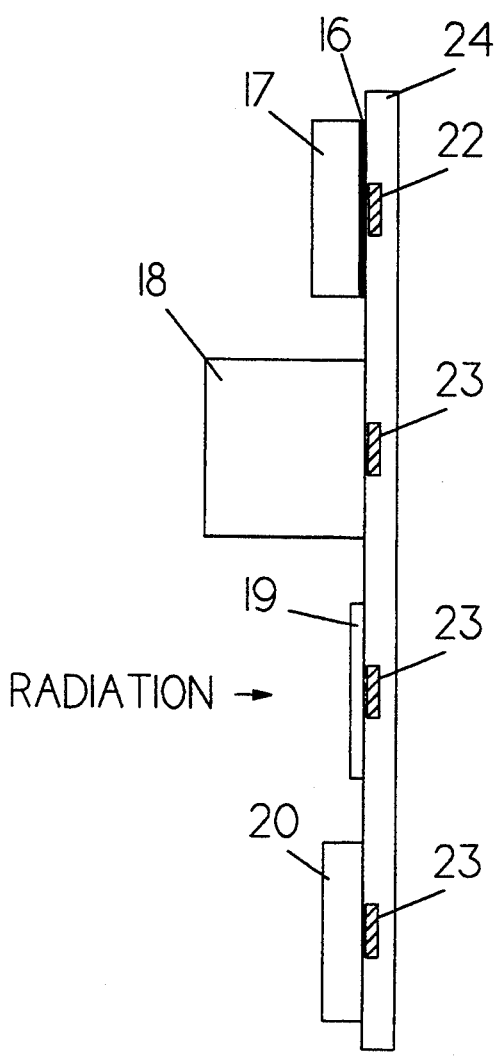
FIG. 3 is a cross-sectional view of the dosimeter shown in FIG. 2.

The construction of a four element dosimeter according to the present invention may be more easily understood with reference to FIGS. 2–3. FIG. 2 is a top view of a dosimeter 10 according to the present invention. FIG. 3 is a cross-sectional view of dosimeter 10 through line 11A–B. Dosimetric element 10 is designed for a mixed field of neutrons with known energy, photons with unknown energy from 20 keV to 2 MeV, and betas with unknown energy from 0.225 to 2.2 MeV (Emax). Dosimeter 10 is constructed from four elements 12–15. Each element comprises one or more filters and a LiF detector. Element 12 is constructed from a 6Li doped detector 22 and the remaining elements are constructed from 7Li doped LiF detectors 23. The detectors are preferably model numbers TLD-700 and TLD-600 detectors, respectively, which may be obtained from Solon Technologies, Inc. of Solon, Ohio.

The four LiF detectors (3.18 × 3.18 mm$^2$) are encapsulated with thin teflon sheets in a TLD card 24. The TLD card is inserted into a holder which has different filtrations for the detectors. Element 12 comprises a 100 mg cm$^{-2}$ (0.38 mm) thick TLD-600 with a filtration of 500 mg cm$^{-2}$ cadmium and 500 mg cm$^{-2}$ plastic. Element 13 is a 100 mg cm$^{-2}$ thick TLD-700 with a filtration of 1000 mg cm$^{-2}$ plastic. Element 14 is a 24 mg cm$^{-2}$ (0.09 mm) thick TLD-700 with a filtration of 17 mg cm$^{-2}$ plastic. As will be explained in more detail below, element 15 is either a 24 mg cm$^{-2}$ thick TLD-700 filtered with 40 mg cm$^{-2}$ plastic or a 100 mg cm$^{-2}$ thick TLD-700 filtered with 100 mg cm$^{-2}$ copper and 900 mg cm$^{-2}$ plastic. The composition of element 15 depends on the radiation field being monitored. The thickness of the teflon encapsulation is included in the total thickness of the filtration.

Table 1 shows the dosimeter's responses in a mixed neutron-photon-beta field for these detectors and filtrations. In the following discussion, the neutron dose equivalent quantity in this study is the maximum dose equivalent ($H_{nm}$) defined in the International Commission on Radiological Protection Publication 21 (ICRP21) (International Commission on Radiological Protection, Data for Protection Against Ionizing Radiation for External Sources. (Oxford: Pergamon Press)

ICRP Publication 21, 1973). The photon and beta dose equivalent quantities are the deep and shallow dose equivalents ($H_{pd}$, $H_{ps}$, $H_{\beta s}$) defined in the Department of Energy Laboratory Accreditation Program (U.S. Department of Energy. *Department of Energy Standard for the Performance Testing of Personnel Dosimetry Systems*. DOE/EH-0027. U.S. Government Printing Office, 1986).

TABLE 1

Summary of detectors and their responses for dosimeter 10[a].

| Element | Thickness and TL Material[b] | Respond To | Sensitivity[c] (mR mSv$^{-1}$) | Signal[d] (mR) |
|---|---|---|---|---|
| 12 | 0.38 mm TLD-600 | neutron photon | $S1_{nm}(E_n)$ $S1_{pd}(E_p)$ | $R1 = R1_n + R1_p$ $= T_h + T_l$ |
| 13 | 0.38 mm TLD-700 | photon | $S2_{pd}(E_p)$ | R2 |
| 14 | 0.09 mm TLD-700 | photon beta | $S3_{ps}(E_p)$ $S3_{\beta s}(E_\beta)$ | $R3 = R3_p + R3_\beta$ |
| 15 | 0.09 mm TLD-700 OR | photon beta | $S4_{ps}(E_p)$ $S4_{\beta s}(E_\beta)$ | $R4 = R4_p + R4_\beta$ |
|  | 0.38 mm TLD-700 | photon | $S4_{pd}(E_p)$ | R4 |

[a]See Figures 2–3.
[b]Size 3.18 × 3.18 mm$^2$.
[c]S1, S2, S3 and S4 are the peaks 3–7 sensitivity of the respective element as a function of energy.
[d]R1, R2, R3 and R4 are the TL signals under the area of peaks 3–7. $T_h$ and $T_l$ are the areas under peaks 6–7 and peaks 3–5 signals, respectively. Subscripts n, p, and β indicate the signal components due to neutrons, photons, and betas, respectively.

Element 12, a thick TLD-600 chip filtered with 1000 mg cm$^{-2}$ material, has response to both neutrons and photons, and is used to measure $H_{nm}$ and $H_{pd}$ from neutrons and photons, respectively. Element 12 has neutron and photon sensitivity functions of $S1_{nm}(E_n)$ and $S1_{pd}(E_p)$, respectively. $E_n$ and $E_p$ are the neutron and photon energies, respectively. Element 13, a thick TLD-700 chip filtered with 1000 mg cm$^{-2}$ plastic, has response to photons only, and is used to measure $H_{pd}$ with a photon sensitivity function of $S2_{pd}(E_p)$. Element 14, a thin TLD-700 chip filtered with 17 mg cm$^{-2}$ plastic, has response to both photons and betas, and is used to measure $H_{ps}$ and $H_{\beta s}$ with sensitivity functions of $S3_{ps}(E_p)$ and $S3_{\beta s}(E_\beta)$, respectively.

If element 15 is a thin TLD-700 chip with a thin 40 mg cm$^{-2}$ plastic filtration, it functions similar to element 14 and has sensitivity functions of $S4_{ps}(E_p)$ and $S4_{\beta s}(E_\beta)$. If element 15 is a thick TLD-700 chip with a thick filtration of 100 mg cm$^{-2}$ Cu and 900 mg cm$^{-2}$ plastic, it functions similar to element 13 and has a photon sensitivity function of $S4_{pd}(E_p)$.

Table 1 also shows that the measured peaks 3–7 signals for elements 12–15 are R1, R2, R3 and R4 (in mR), respectively. The low temperature and high temperature peak signals of element 12, are peaks 3–5 ($T_l$) and peaks 6–7 ($T_h$), respectively (i.e., $R1 = T_l + T_h$). For illustration purposes, the signals of elements 12, 14 and 15 are separated into two signals (e.g., R1 is separated into $R1_n$ and $R1_p$, where $R1_n$ and $R1_p$ are the signals of element 12 that are contributed from neutrons and photons, respectively). The sensitivity functions may be determined by exposing groups of dosimeters on a Lucite slab phantom to monoenergetic neutron radiations.

Element 12 of dosimeter 10 exposed to neutrons of $H_{nm}$ dose equivalent and photons of $H_{pd}$ dose equivalent has two measured signals, $T_h$ and $T_l$, which satisfy the following two equations:

$$T_h = H_{nm} S1_{nm} K_n + H_{pd} S1_{pd} K_p \qquad (1')$$

$$T_l = H_{nm} S1_{nm}(1-K_n) + H_{pd} S1_{pd}(1-K_p) \qquad (2')$$

where $T_h$, $T_l$ are the areas under peaks 6–7 and peaks 3–5, respectively, in mR.

$S1_{nm}$, $S1_{pd}$ are neutron and photon peaks 3–7 sensitivities of element 12.

$K_n$, $K_p$ are neutron and photon K values, respectively.

To determine the $H_{nm}$ and $H_{pd}$ from equations 1' and 2', the photon and neutron energies must first be known so that the $K_p$, $S1_{nm}$ and $S1_{pd}$ can be determined from the relevant calibration curves.

The four-element dosimeter exposed to neutron, photon and beta dose equivalents ($H_{nm}$, $H_{pd}$, $H_{ps}$ and $H_{\beta s}$) generates five measured signals ($T_h$, $T_l$, R2, R3 and R4). These signals satisfy Eqs. 1' and 2' described above and the following three equations:

$$H_{pd} S2_{pd} = R2 \qquad (3)$$

$$H_{\beta s} S3_{\beta s} + H_{ps} S3_{ps} = R3_\beta + R3_p = R3 \qquad (4)$$

$$H_{\beta s} S4_{\beta s} + H_{ps} S4_{ps} = R4_\beta + R4_p = R4 \qquad (5)$$

$$H_{pd} S4_{pd} = R4 \qquad (5a)$$

Equations 3 and 4 are for elements 13 and 14, respectively. Equation 5 is for the thin element 15 while Eq. 5a is for the embodiment utilizing the thick element 15. These equations may be solved with the aid of the calibration curves using conventional numerical techniques.

As noted above, element 15 has two alternative embodiments. The embodiment employing a thick detector is preferred in a mixed field with low energy photons (20–40 keV) but no low energy betas (<1 MeV). The reason is explained as follows. Element 12 is designed to respond to albedo neutrons and not to incident thermal neutrons. The thickness of the cadmium filtration for element 12 is 500 mg cm$^{-2}$ which can absorb 99.9% of the incident thermal neutrons. For a TLD-600 chip, the thermal neutron sensitivity is about one hundred times higher than the fast neutron (1 MeV) sensitivity and the fast neutron sensitivity is about the same as the photon sensitivity. The cadmium filtration thickness is selected to eliminate the TLD-600 response to the incident thermal neutrons in almost all field situations.

However, there is one problem inherent in the use of cadmium for thermal neutron filtration. Because of the high atomic number of the cadmium, the relative photon response ratio of elements 12 and 13 drops rapidly as the photon energy decreases. Below about 60 keV, there is too much attenuation of the incident photon beam and it becomes difficult to derive the photon energy using the calibration curves. The usable photon energy threshold may be lowered by using a thinner cadmium filter. However, the minimum cadmium thickness is limited by the thermal/fast neutron dose equivalent ratio in the field.

Therefore, in a mixed field with low energy photons (20–40 keV) where the use of cadmium filtration may not be appropriate, one element utilizing a TLD-700 with a filtration of 100 mg cm$^{-2}$ copper and 900 mg cm$^{-2}$ plastic is preferred. Such would typically be element 15. This element has less photon attenuation, and hence, provides more reliable photon energy data.

Since there are no low energy beta rays to be measured in this field situation, a thicker detector may be used. The thicker detector provides increased photon detection efficiency.

In a mixed field with low energy betas (<1 MeV) but no low energy photons (20–40 keV), the thin element 15 option is preferred.

In those rare situations in which a mixed field having both low energy photons and low energy betas are expected, all five elements can be used. That is, both the thick and the thin embodiments of elements 15 are used. This mixed field situation, which would require the use of all five elements, should be rare. Almost all currently available dosimeters would have difficulty making measurements in such a field.

Accordingly, there has been described herein a dosimeter with a minimum number of elements designed to be used in an unknown neutron-photon-beta mixed field. Using the high temperature peak characteristics of 6Li doped LiF detectors and a filtration methodology, together with the predetermined neutron, photon and beta sensitivities of the elements, the dosimeter can measure the neutron, photon and beta dose equivalents in a mixed field. Three variations of the basic design can be tailored to meet different field conditions. Various modifications to the present invention will become apparent to those skilled in the art from the foregoing description and accompanying drawings. The present invention is to be limited solely by the scope of the following claims.

What is claimed is:

1. A method for measuring the radiation exposure of a human subjected to a radiation field comprising neutrons, and photons, said method comprising the steps of:
   placing a first detection means for measuring neutrons and photons on said human being, said detection means comprising a 6Li doped LiF thermoluminescent detector;
   removing said first detection means from said human being after said exposure;
   heating said 6Li doped LiF thermoluminescent detector and measuring the light produced thereby to determine a first value which is indicative of the neutron radiation to which said human being was exposed and a second value indicative of the photon radiation to which said human being was exposed.

2. The method of claim 1 wherein said human is also subjected to beta rays and wherein said method further comprises the steps of:
   placing second, third and fourth detection means on said human being in addition to said first detection means, said second detection means being insensitive to beta rays, said third detection means comprising means for measuring both photons and beta rays, and said fourth detection means comprising means for measuring both photons and beta rays, said fourth detection means having different relative sensitivities to photons and beta rays than said third detection means; and
   combining measurements from said second, third, and fourth detection means with said first and second values of the first detection means to provide an estimate of the dose equivalents of said human being to a radiation field comprising photons neutrons, and beta rays.

* * * * *

UNITED STATES PATENT AND TRADEMARK OFFICE
CERTIFICATE OF CORRECTION

PATENT NO. : 5,340,985
DATED : August 23, 1994
INVENTOR(S) : Liu

It is certified that error appears in the above-indentified patent and that said Letters Patent is hereby corrected as shown below:

Column 2, line 27, delete "6LiF" and insert therefor --$^6$LiF--.

Column 2, line 40, delete "6LiF" and insert therefor --$^6$LiF--.

Column 2, line 50, delete "6LiF" and insert therefor --$^6$LiF--.

Column 2, line 62, delete "6Li" and insert therefor --$^6$Li--.

Column 2, line 63, delete "7Li" and insert therefor --$^7$Li--.

Column 3, line 17, delete "6Li" and insert therefor --$^6$Li--.

Column 3, line 22, delete "6Li" and insert therefor --$^6$Li--.

Column 3, line 33, delete "FIGURE" and insert therefor --figure--.

Column 3, line 58, delete "T" and insert therefor --$T_f$--.

Column 3, line 59, delete "Th" and insert therefor --$T_h$--.

Column 4, line 37, delete "6Li" and insert therefor --$^6$Li--.

Column 4, line 39, delete "7Li" and insert therefor --$^7$Li--.

Column 6, line 9, delete "And" and insert therefor --and--.

Column 7, line 23, delete "6Li" and insert therefor --$^6$Li--.

Column 8, line 6, delete "6Li" and insert therefor --$^6$Li--.

UNITED STATES PATENT AND TRADEMARK OFFICE
CERTIFICATE OF CORRECTION

PATENT NO. : 5,340,985
DATED : August 23, 1994
INVENTOR(S) : Liu

It is certified that error appears in the above-indentified patent and that said Letters Patent is hereby corrected as shown below:

Column 8, line 10, delete "6Li" and insert therefor --$^6$LI--.

Signed and Sealed this

First Day of November, 1994

Attest:

BRUCE LEHMAN

Attesting Officer

Commissioner of Patents and Trademarks